United States Patent
Schmitz (10) Patent No.: US 7,265,894 B2
(45) Date of Patent: Sep. 4, 2007

(54) BI-DIRECTIONAL PRINTER WIPER FOR PRINTING ON BICHROMAL OR MULTI-COLORED ELECTRONIC PAPER

(75) Inventor: Gregory P. Schmitz, Los Gatos, CA (US)

(73) Assignee: Xerox Corporation, Stamford, CT (US)

( * ) Notice: Subject to any disclaimer, the term of this patent is extended or adjusted under 35 U.S.C. 154(b) by 827 days.

(21) Appl. No.: 10/739,661

(22) Filed: Dec. 18, 2003

(65) Prior Publication Data

US 2005/0134551 A1   Jun. 23, 2005

(51) Int. Cl.
G02B 26/00 (2006.01)
G09G 3/34 (2006.01)
G03G 17/04 (2006.01)
(52) U.S. Cl. .................... 359/296; 345/107; 430/35
(58) Field of Classification Search ................ 359/296; 345/107; 430/32, 35, 38
See application file for complete search history.

(56) References Cited

U.S. PATENT DOCUMENTS

| | | | |
|---|---|---|---|
| 4,126,854 A | 11/1978 | Sheridon | |
| 5,389,945 A | 2/1995 | Sheridon et al. | |
| 5,717,515 A | 2/1998 | Sheridon | |
| 5,894,367 A | 4/1999 | Sheridon | |
| 6,055,091 A | 4/2000 | Sheridon et al. | |
| 6,222,513 B1 | 4/2001 | Howard et al. | |
| 6,262,707 B1 | 7/2001 | Sheridon | |
| 6,291,925 B1* | 9/2001 | Jacobson | .................... 310/319 |
| 6,456,272 B1 | 9/2002 | Howard et al. | |
| 2003/0071800 A1 | 4/2003 | Vincent et al. | |
| 2003/0137477 A1 | 7/2003 | Dances | |

OTHER PUBLICATIONS

European Search Report, Application No. EP 04 02 9257, Search completed Apr. 13, 2005, Examiner S. Ward.

* cited by examiner

Primary Examiner—Ricky Mack
Assistant Examiner—William C Choi
(74) Attorney, Agent, or Firm—Fay Sharpe LLP (57) ABSTRACT

An electric display system includes electric display material having two opposing outer surfaces, wherein at least one of the outer surfaces is at least partially covered in a plurality of spaced apart, charge-retaining islands comprised of a conductive material with areas of the insulating material interposed therebetween. A charge transfer device is arranged in operative association with the display material, having a first component made of a flexible, non-conductive material and a plurality of individually adjustable conductive elements, wherein movement of one adjustable conductive element does not result in movement of another adjustable conductive element.

29 Claims, 10 Drawing Sheets

BI-DIRECTIONAL PRINTER WIPER FOR PRINTING ON BICHROMAL OR MULTI-COLORED ELECTRONIC PAPER

BACKGROUND

This application relates to the use of electronic display systems, and more particularly to components used in the generation of images on the displays. In one embodiment the display systems are designed to include gyricon electric reusable paper but may also be electric reusable paper based on liquid crystal, electrophoretic, and other field-effect display technologies.

Electric reusable paper can be defined as any electronically-addressable display medium that approximates paper in form and function. Electric reusable paper should be light-weight, thin, and flexible, and it should display images indefinitely while consuming little or no power. In addition, electric reusable paper should be re-usable. One must be able to erase images and create new ones repeatedly. Preferably, electric reusable paper should display images using reflected light and allow a very wide-viewing angle.

One way to make electric reusable paper possible using traditional electronic display technology is to completely remove the driving electronics from an electronic display package and use external addressing electrodes to write and erase images. This approach both reduces the per unit cost of electronic paper sheets and enables the use of cheap, flexible plastic films in place of glass plates for packaging. Multiple electronic paper sheets can then be addressed by a single set of external driving electronics, much like multiple sheets of pulp paper are printed on by a single printer.

A sheet and display system dubbed gyricon is disclosed in various patents and articles, such as U.S. Pat. No. 4,126,854 by Sheridon, titled "Twisting Ball Display", incorporated herein in its entirety. The gyricon display system is comprised of a host layer a few mils thick which is heavily loaded with bichromal elements, possibly spheres, several microns in diameter. In one implementation, each bichromal element has halves of contrasting colors, such as a white half and a black half. Each bichromal element also possesses an electric dipole, orthogonal to the plane that divides the two colored halves. Each bichromal element is contained in a cavity filled with a dielectric liquid. Upon application of an electric field between electrodes located on opposite surfaces of the host layer, the bichromal elements will rotate depending on the polarity of the field, presenting one or the other colored half to an observer. It is noted that in addition to black and white electric displays, electric displays providing highlight color and additive full color have been disclosed. U.S. Pat. No. 6,456,272 by Howard et al., titled, "Field Addressed Displays Using Charge Discharging in Conjunction With Charge Retaining Island Structures", and U.S. Pat. No. 5,717,515 by Sheridon issued Feb. 10, 1998 and titled "Canted Electric Fields For Addressing A Twisting Ball Display" (each incorporated herein in their entirety by reference) describe several methods for making highlight color and full color versions of a electric reusable paper substrate and display.

An electric reusable paper substrate has many of the requisite characteristics of electric reusable paper, namely, bistable image retention, wide viewing angle, thin and flexible packaging, and high reflectance and resolution. U.S. Pat. No. 5,389,945 issued to Sheridon on Feb. 14, 1995, and titled "Writing System Including Paper-Like Digitally Addressed Media And Addressing Device Therefor", describes an electric reusable paper printing system that employs independent, external addressing means to put images on the Electric reusable paper substrates. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the polarity of the electric fields.

A common implementation of electric displays will use charge-retaining island patterning on the electric reusable paper sheets. This technique has been described in U.S. Pat. No. 6,222,513 by Howard et al., titled "Charge Retention Islands For Electric Paper And Applications Thereof", incorporated herein in its entirety by reference.

Charge-retaining island patterning is an electric reusable paper sheet that uses a pattern of conductive charge-retaining islands on the outward-facing side of at least one of two opposed outward surfaces. The second outward surface may also be coated with a conductive material, or made of a conductive material, and may or may not be patterned. The charge-retaining islands of the patterned surface or surfaces receive electric charges from an external charge-transfer device. After the charge-transfer device is removed, the conductive, charge-retaining islands hold electric charge, creating an electric field in the electric reusable paper of sufficient magnitude and duration to cause an image change.

An alternate embodiment of the charge-retaining island approach utilizes charge-retaining islands which are created as part of the bulk of the encapsulating layer instead of being patterned on the surface of the layer. Extending the conductivity of the charge-retaining islands through the bulk of the encapsulating layer to the sheet contained therein improves the performance of the charge-retaining islands and reduces problems of image instability when handled immediately after addressing.

A suitable mechanism for transferring charge to charge-retaining islands is by contact charging, whereby, a mechanical contact is made between conductive contact elements of an external charge transfer device and the conductive charge-retaining islands. When in contact, charge is transferred across the interface bringing the charge-retaining islands to the same electric potential as the contact elements. Charge remains on the charge-retaining islands, maintaining a voltage and an electric field in the sheet, well after contact is broken and the contact elements are removed from the writing area.

Mechanical contact may be made by use of a charge transfer device configured with alternating conductive charge transfer elements/conductors and insulating material. For proper operation, the charge transfer conductors need to make reliable contact to the charge-retaining islands while moving with respect to the electric paper sheet during image generation. Arrays using springy wire electrodes soldered to the edge of a printed circuit board have been demonstrated. More robust arrays utilizing anisotropically conductive elastomer connectors, such as Zebra connectors (e.g., conductive strip), as known in the art, have also been used.

A practical concern of proposed systems for printing on electric paper is the inability to insure reliable contact between the charge transfer device and the charge-retaining islands. The conductive strip and flexible printed circuit board strip commonly used to charge a charge-retaining island on electric paper, exhibit no appreciable memory (i.e., rigidity) along their length or width, making contact with the charge-retaining islands inconsistent, and thereby limiting print quality.

This inconsistent contact is exacerbated due to the non-planar surfaces of the electric paper. Particularly, existing manufacturing processes for forming the surface of electric paper cause imperfections and oscillations in its surface and, therefore, an undulating profile for the surface carries the charge-retention islands. Additionally, the surface may further have to deal with dirt and/or debris located in the insulating channels between the charge-retention islands. Due to the supple nature of the charge transfer device, when the charge transfer device operate in such environments, direct contact between the conductive strip and the electric paper surface is not fully maintained. Therefore, charging of the charge-retaining islands is inconsistent, resulting in streaks and fringes on the printed image.

SUMMARY

An electric display system includes electric display material having two opposing outer surfaces, wherein at least one of the outer surfaces is at least partially covered in a plurality of spaced apart, charge-retaining islands comprised of a conductive material with areas of the insulating material interposed therebetween. A charge transfer device is arranged in operative association with the display material, having a first component made of a flexible, non-conductive material and a plurality of individually adjustable conductive elements, wherein movement of one adjustable conductive element does not result in movement of another adjustable conductive element.

DETAILED DESCRIPTION OF THE PREFERRED EMBODIMENTS

Figure 1:
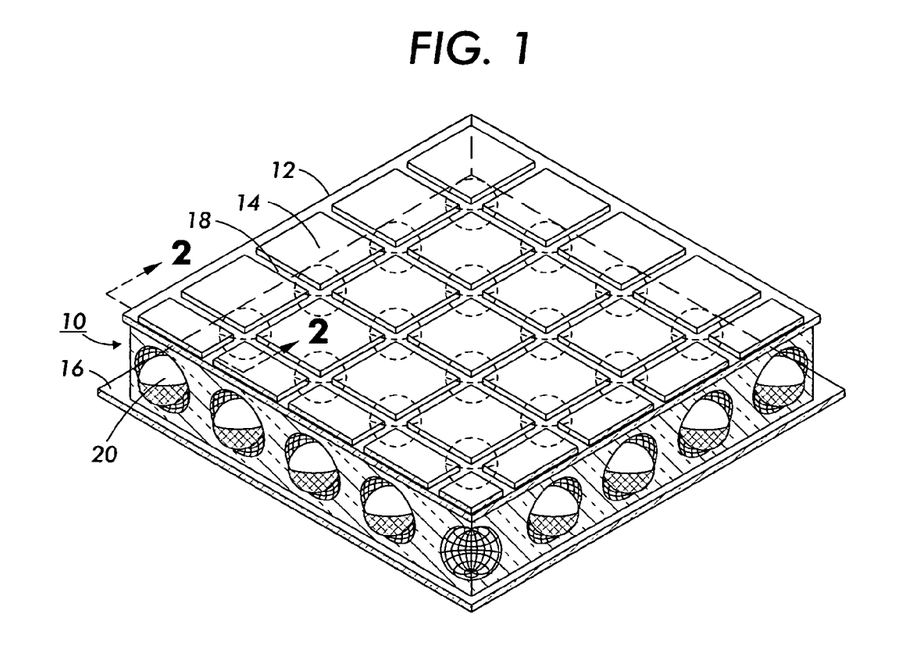
FIG. 1 shows a perspective view of an electric reusable paper sheet, according to the present application.

Turning now to FIG. 1 an electric reusable paper sheet, according to an embodiment described in the present application, is shown. The electric reusable paper sheet includes an electric reusable paper substrate such as a gyricon sheet 10 which contains bichromal elements 20, a first encapsulating layer 12 patterned with conductive charge-retaining islands 14, and a second encapsulating layer 16 that may or may not be patterned with charge-retaining islands. Although the bichromal elements 20 are pictured here as substantially spherical, it should be noted that other configurations are also possible. In particular, bichromal elements that are substantially cylindrically shaped are also known. A complete discussion of twisting cylinder electric reusable paper substrates, their use and manufacture can be found in U.S. Pat. No. 5,894,367 issued Apr. 13, 1999, titled "Twisting Cylinder Display Using Multiple Chromatic Values" by Sheridon, incorporated by reference herein in its entirety.

Together, the first encapsulating layer 12 and the second encapsulating layer 16 is configured to do the following things: contain an electric reusable paper substrate 10, provide at least one transparent window through which the electric reusable paper substrate 10 can be viewed, and provide at least one external surface patterned with charge-retaining islands 14 that can be addressed with an external charge transfer device. The first encapsulating layer 12 and second encapsulating layer 16 could take the form of thin plastic sheets that are sealed or fastened around the perimeter of the electric reusable paper substrate 10. The second encapsulating layer 16 need not be entirely separate from the first encapsulating layer 12. The second encapsulating layer 16 could simply be an extension of the first encapsulating layer 12, folded over and around the edge of the sheet and then sealed or fastened around the remaining perimeter. The first encapsulating layer 12 and second encapsulating layer 16 could also take the form of a coating, applied by spraying, doctoring, or some other method to hold the contents of the electric reusable paper substrate 10.

Charge-retaining islands 14 have square perimeters and are organized in a simple two-dimensional x-y matrix. Narrow channels 18 of encapsulating material layer 12 separate the charge-retaining islands 14. The channels 18 serve to isolate the charge-retaining islands 14, preventing migration of charge laterally across the encapsulating sheet, and should be small with respect to the charge-retaining islands 14, so that the maximum possible area of the display is covered with conductive charge-retaining material. The channels 18 must not become so small, though, that they fail to prevent significant charge leakage across the charge-retaining islands 14. Even if island-channel proportions are properly designed, in practice, dirt and accumulated debris can provide conduction paths across channels. Therefore, it is important to keep the surface of the patterned encapsulating layers clean.

It should be noted that the charge-retention islands need not be implemented in a regular two-dimensional pattern utilizing an x-y matrix. Other patterns are possible including a charge-retaining island pattern that utilizes a random array. When using other patterns, it is important that the charge-retaining islands 14 be relatively large compared to the channels 18. In a random distribution, both feature sizes must be much smaller than the pixel size of a displayed image. Pixel size is determined by the size or range of addressing elements of an external charge transfer device independently of the size of the charge-retaining islands 14. The charging array need not be registered or aligned perfectly with the pattern, though, because large groups of islands are charged by each addressing element and moiré effects are negated by the randomness of the island pattern.

The electric reusable paper substrate 10 can be constructed by techniques already known in the art. The charge-retaining islands 14 can be created on or in the encapsulating layer 12 by many means with any suitably conductive material. One technique creates islands of conductive and transparent Indium Tin Oxide (ITO) on a z-axis only conductive film. Z-axis conductive films are known and generally consist of a matrix loaded with conductive particles, such as silver coated glass beads, to allow for an electrically conductive interconnection through the films thickness. However, the conductive particles are spaced far enough apart to be electrically insulative in the plane of the film. The z-axis only conductive film is coated with a very thin layer of ITO, and then channels are etched in the ITO by photo-lithographic processes well known in the art. The remaining conductive ITO regions act as charge-retaining islands, while the channels 18 are created by the underlying z-axis only conductive film. Any conductive material such as chrome, aluminum, polyaniline which can be applied to form discontinuous conductive regions could be used in place of the ITO. Many z-axis only conductive materials, such as those made by 3M Corporation of St. Paul, Minn., Fuji Poly of Kenilworth, N.J., or Shin-Etsu Polymer Company, Limited of Japan, are possible candidates for a substrate on which to build the islands.

Figure 2:
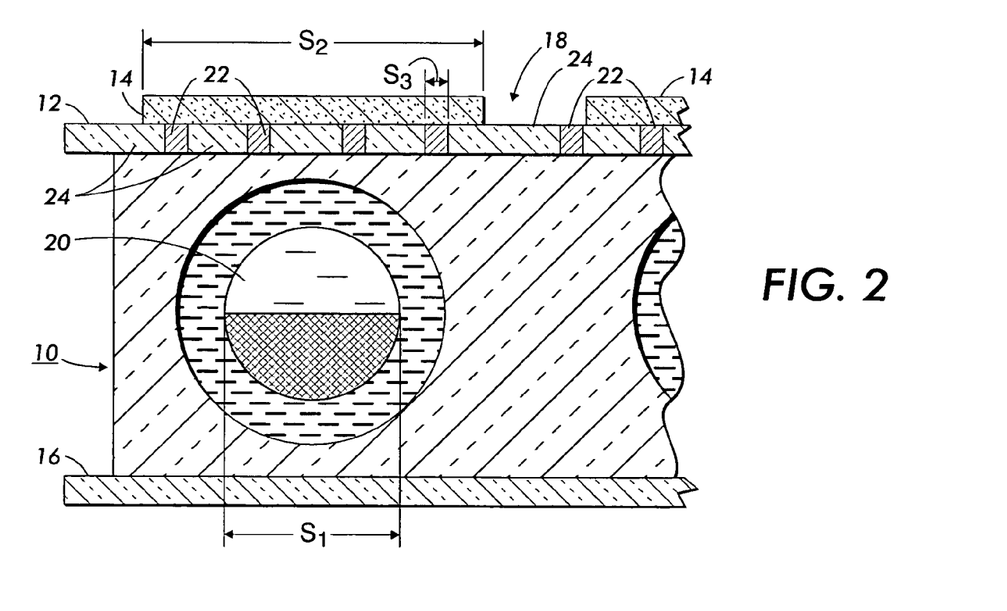
FIG. 2 shows an enlarged cross-sectional view of an electric reusable paper sheet according to the present application.

FIG. 2 shows an enlarged cross-sectional view of the electric reusable paper sheet shown in FIG. 1 taken through cross-section line 2-2. As can be seen in FIG. 2, the encapsulating layer 12 is clearly comprised of alternating conductive regions 22 and non-conductive regions 24. The rotational element 20, the charge-retaining island 14, and the conductive regions 22 each have a size s1, s2, and s3 respectively. The size s2 of the charge-retaining island 14 is shown to be on the order of the same magnitude of the size s1 of the rotational element 20. To achieve element rotation the size s2 of the charge-retaining island 14 should be no smaller than ½ the size s1 of the rotational element 20. The size of the conductive region s3 however, is substantially smaller than the size s2 of the charge-retaining island 14. The size of the conductive regions 22 should be kept as small as possible, but no larger than ⅓ of the size of the charge-retaining island 14. The conductive regions 22 in the encapsulating layer need not be of uniform size or distribution throughout the encapsulating layer 12, however they should be small enough and distributed enough throughout the encapsulating layer 14 such that at least one conductive region 22 is associated with as many charge-retaining islands 14 as possible for optimal performance.

Also, the conductive regions 22 should be placed relative to the charge-retaining islands 14 so that they do not bridge the channel 18 between two charge-retaining islands 14. The size and distribution will vary with manufacturing techniques. For instance, if accurate placement of the conductive regions 22 can not be maintained then it may be desirable to make the conductive regions 22 much smaller than the size of the channel 18 to insure that a conductive region 22 can not bridge the channel 18 between two charge-retaining islands 14 as shown in FIG. 2.

The size s3 of any single conductive region 22 is too small to effectively rotate the rotational element. However, the charge-retaining island 14 in conjunction with the conductive regions 22 can together effectively be addressed and achieve rotation of the rotational element without suffering from the image instability problems associated with charge removal when an electric reusable paper sheet is handled immediately after addressing.

An external charge transfer device must also be chosen to work with a charge-retaining island pattern. Examples are described in U.S. Pat. No. 6,222,513 by Howard et al., titled "Charge Retention Islands For Electric Paper And Applications Thereof", and U.S. Pat. No. 6,456,272 by Howard et al., titled "Field Addressed Displays Using Charge Discharging In Conjunction With Charge Retaining Island Structures". As mentioned, a suitable mechanism identified for transferring charge to charge-retaining islands, is contact charging, whereby, a mechanical contact is made between conductive contact elements of an external addressing array and the conductive charge-retaining islands. When in contact, charge is transferred across the interface bringing the charge-retaining islands to the same electric potential as the contact elements. Charge remains on the charge-retaining islands, maintaining a voltage and an electric field in the sheet, well after contact is broken and the contact elements are removed from the writing area.

Various mechanical arrangements have been envisioned for external charge transfer devices that utilize the above charge transfer mechanisms. One of these is a one-dimensional array of charge transfer elements which could be built and used like a printhead or wand. The contact charging wand is comprised of alternating conductive charge transfer elements and insulating elements.

The charge-retaining islands technique, described above, can also be used to implement a gyricon with grey scales, highlight color, additive full color, or custom colors using only simple bichromal elements.

Figure 3:
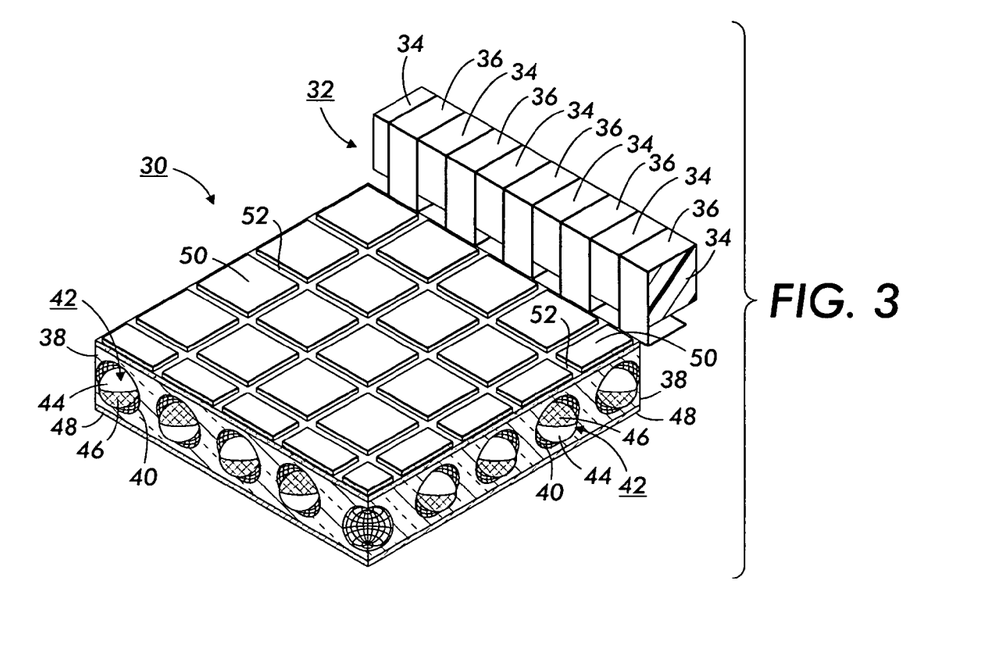
FIG. 3 is an electric reusable paper sheet illustrating a first embodiment of an arrayed charged transfer device implementation.

FIG. 3 shows a portion of an electric reusable paper sheet 30 with a first embodiment of an arrayed charge transfer device 32 containing alternating portions of insulating elements 34 and charge transfer elements 36. In this embodiment, the charge transfer elements 36 may be springy electrodes soldered to insulating elements 34 such as parts of a circuit board. The electric reusable paper sheet 30 comprises an electric reusable paper substrate, such as gyricon sheet 38 with fluid filled cavities 40, wherein each cavity contains a bichromal element such as bichromal element 42 which is divided into two different portions 44, 46, each portion having an optical characteristic. One surface of the electric reusable paper sheet 30 is covered with a conductive material 48 to provide an equipotential surface while the other surface of the electric reusable paper sheet 30 is covered with an array of charge-retaining islands 50 separated by channels 52.

Figure 4:
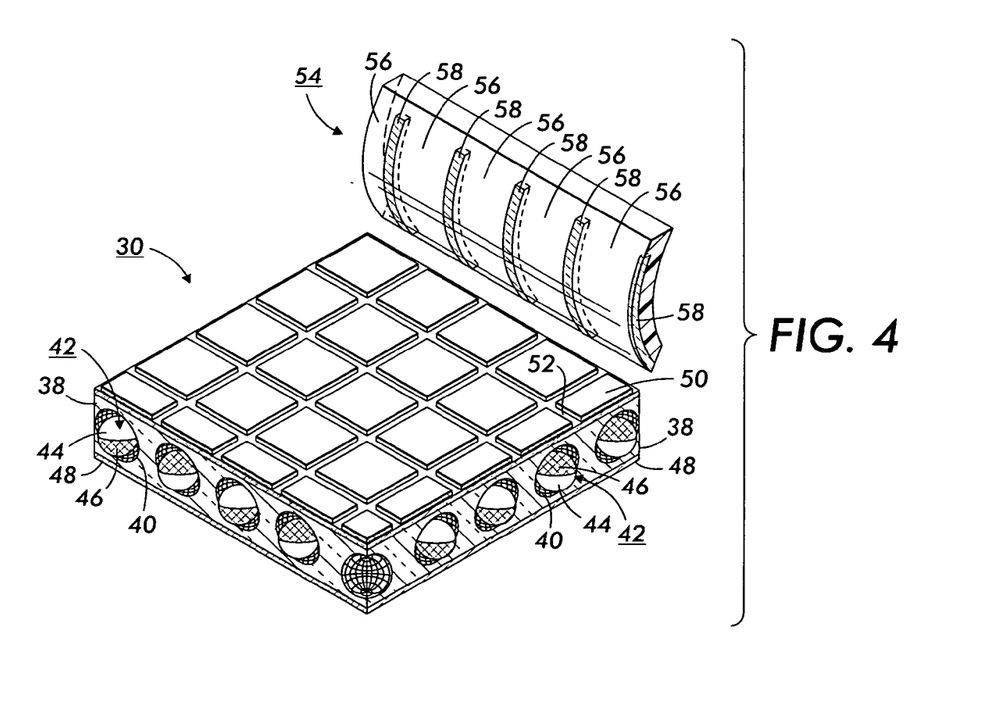
FIG. 4 is an electric reusable paper sheet illustrating an Zebra conductive wand implementation.

Turning to FIG. 4, an alternative arrayed charge transfer device 54 is shown configured as a conductive strip or wand (i.e., Zebra conductor), which in one embodiment is made of an elastomer, plastic or other flexible, compliant non-conductive material 56, with conductive wires 58 embedded or otherwise connected to the non-conductive material 56. It should be noted that these particular configuration(s) are used for illustrative purposes only and the foregoing described variations in charge transfer devices and construction of charge-retaining islands and equipotential surfaces are also applicable.

Further, while FIGS. 3 and 4 show only one bichromal element associated with each charge-retaining island, in practice it would be more likely that many bichromal elements would be associated with a given charge-retaining island. In such instances, the bichromal elements can be arranged in any pattern such as close packed array or a random distribution as is already known in the art. Furthermore, while the bichromal elements are shown as bichromal spheres in this drawing, they need not be spheres but might also be bichromal cylinders as described in U.S. Pat. No. 6,055,091, titled "Twisting Cylinder Display", by Sheridon et al., assigned to the same assignee and herein incorporated in its entirety herein by reference.

Figure 5:
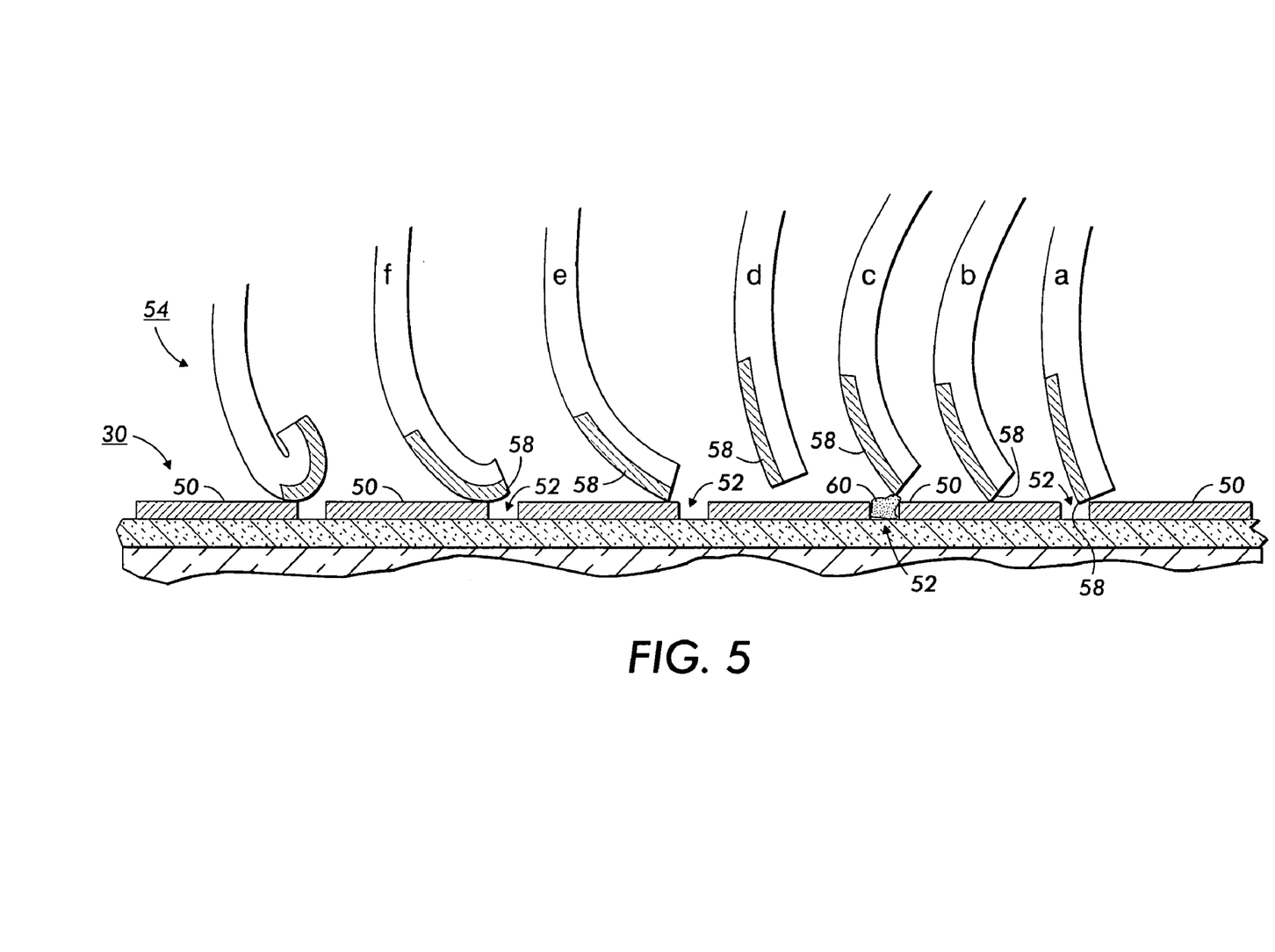
FIG. 5 depicts a non-planar surface which results in a non-reliable contact between the charge transfer device and the charge-retention islands.

Turning to FIG. 5, illustrated is a side view of electric usable paper sheet 30 with conductive strip (i.e., Zebra conductor) 54, shown at stages a-f as conductive 54 moves over the surface comprised of islands 50 and channels 52. One difference between this implementation and that of FIG. 4 is that in at least one of the channels 52, an impediment 60, such as a deformation of the surface occurring during manufacture, or dirt/debris on the surface causes the surface to be other than planar. As previously noted, and as illustrated in the movement of charge transfer device 54 through steps a-f, such impediment may cause incomplete contact between charge transfer device 54 and the surface of charge-retaining islands 50. More specifically, as shown at point a, movement of charge transfer device 54 starts below island surface 50, whereby the entire surface of charge-retaining island 50 will come into contact with conductive wires 58 as charge transfer device 54 is moved along, as shown at position b. However, at position c, the charge transfer device 54 impinges on impediment 60. As it passes the impediment and reaches position d, conductive wire 58 is not in contact with the surface of charge-retaining island 50. In some cases, there will be time for charge transfer device 54 to have contact with some portion of the island as shown at point e. However, in other instances, there will be no contact until movement is to the next charge-retaining island 50. While charge transfer device 54 is shown touching the surface of charge-retaining island 50 in step e, even if there is contact, the contact may be insufficient to permit a proper transfer of charge.

As illustrated in FIG. 5, it is desirable to have a sharp edge of conductive strip 54 to come into contact with the charge-retaining islands 50. Another drawback of an overly flexible conductive strip is illustrated at position f. In this instance, when the downward pressure is over a certain value, the compression in the conductive strip will cause the sharp end to curl up in an undesirable fashion. Thus, with insufficient support, this curled-up position results in a less-than-desirable contact between the conductive strip and charge-retaining islands.

Also, while charge transfer 54 is depicted in FIG. 5, issues related to image quality also exist in connection with the charge transfer device of FIG. 3.

A further drawback of a system employing the disclosed embodiments of charge transfer devices 32 and 54, is that they are substantially connected as a single unified piece. For example, charge transfer device 32 is shown as a solid connected structure. If charge transfer element 36 of charge transfer device 32 is forced in an upward direction when it impinges on a piece of debris, or an uneven surface of the reusable paper sheet 30, due to the connected nature of charge transfer device 32, this movement is transferred through the insulating elements 34 to other charge transfer elements 36 thereby causing a distant charge transfer element 36 to rise above the surface even though it does not come into contact with an impediment. Therefore, this "ripple" effect results in distant charge transfer elements from being less than fully efficient in the charge transfer process, resulting in degraded images.

Similar to FIG. 3, charge transfer device 54 is also designed as a single uniform structure, where movement by one of the conductive wires 58 will cause others to be raised away from the surface resulting in less than desirable charge transfer.

It has been determined that charge transfer elements which are independently responsive to changes of the electric paper surface and/or impediments on the surface of the paper, such that movement of an individual charge transfer element does not affect the position of other transfer elements of a printhead will improve the outputs of electric paper systems.

Figure 6:
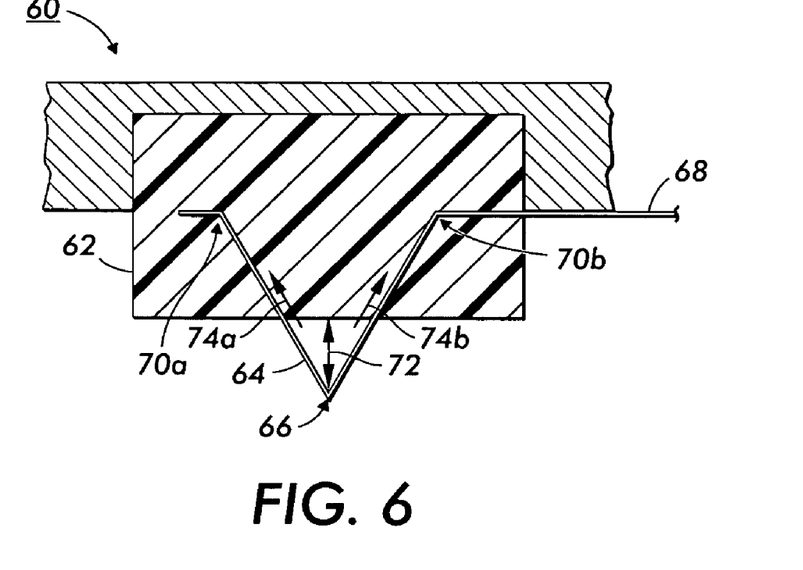
FIGS. 6-9 are side views of various printhead embodiments.

FIG. 6 is a side view of a flexible printhead 60 in accordance with one aspect of the present application. Printhead 60 includes flexible non-conductive material 62 such as a block which has encased therein at least a portion of individually adjustable elements 64, such charge transfer finger elements. Extending from block 62 is finger contact end 66 which is positioned for contact to the islands of electric paper. An electrical contact 68 extends from a side of block 62 for connection to a signal generator, such as a microprocessor or other controller chip. Charge transfer fingers 64 are configured in a V-shaped position where flexibility of finger elements 64 is increased by use of flex points 70A, 70B, located within block 62. In this design, as shown by arrow 72, when printhead 60 is placed into contact with the electric paper, the resulting pressure onto finger elements 64 causes flexure designated by arrows 74A and 74B at flex points 70A, 70B. This configuration permits for an appropriate balance between flexibility and a rigidity as printhead 60 passes over the electric paper surface. Further, this design allows for bi-directional operation as the rigidity and flexibility balance is maintained irrespective of movement of printhead 60 in a first or second opposite direction as it traverses back and forth across the surface.

Figure 7:
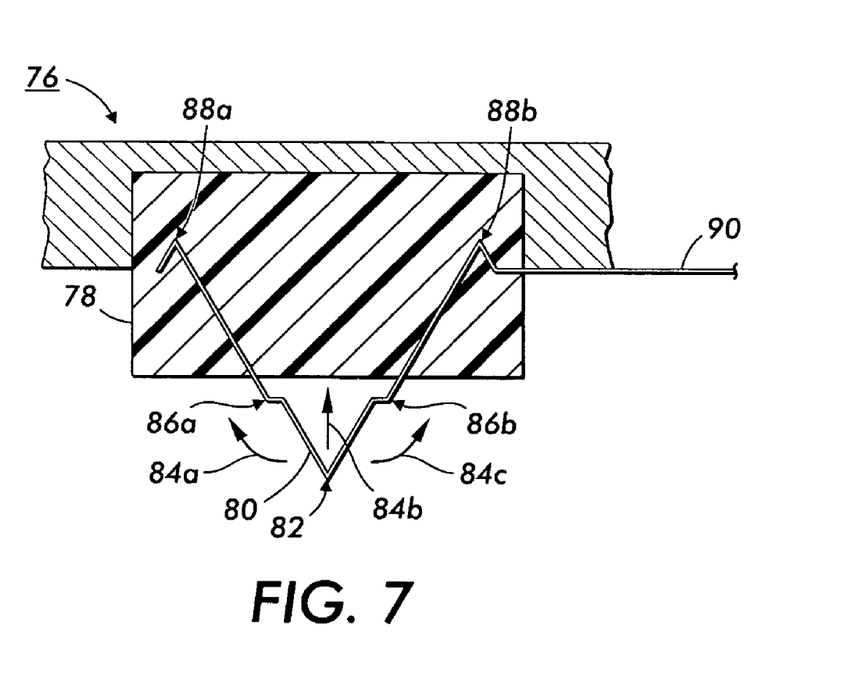

Turning to FIG. 7, illustrated is a second embodiment of a flexible printhead 76. In this design, block 78 is also a flexible encasement in which a second type of charge transfer finger elements 80 are at least partially encased. Finger elements 80 are designed to have multiple flex points whereby flexibility outside of block 78 is greater than the flexibility within the block. Particularly, as pressure is applied at finger contact end 82, upward pressure exists as designated by arrows 84a, 84b, and 84c creating an initial tension and pressure at flexible points 86a and 86b, which are located external to block 78. Thus, the initial and greatest amount of pressure for flexing is placed on points 86a and 86b. Additional pressure which passes through these points is then absorbed by flex points 88a and 88b. Similar to the previous embodiment, another portion external to block 78 is electrical contact 90, which is provided for connection to electrical signal generators.

Figure 8:
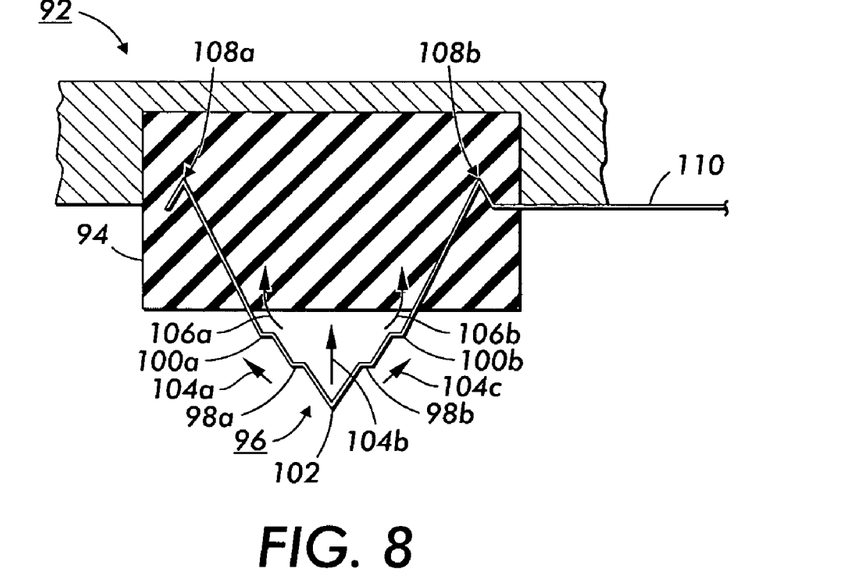

Turning to FIG. 8, set forth is printhead 92 designated as a third embodiment which will permit for bi-directional operation. In this design, block 94 holds a third type of charge transfer finger elements 96 which have further increased flexibility outside of block 94. Additionally defined flex points 98a and 98b provide a first level for flexibility, and flex points 100a and 100b provide a second level of flexing when pressure is applied at finger contact end 102. These flex points are outside of the encasement created by block 94. Therefore, pressure applied in the direction of arrows 104a-104c cause pressure at flex points 98a and 98b. Pressure existing past these flex points, designated by arrows 106a-106b, result in flexing at points 100a, 100b. Lastly, any remaining pressure is absorbed at flex points 108a, 108b which are encased in block 94. The inclusion of additional flex points in embodiment three of FIG. 8 results in an overall increased flexibility of transfer elements 96. Electrical connector 110 extends outside of block 94 for connection to electrical signal generating devices.

Figure 9:
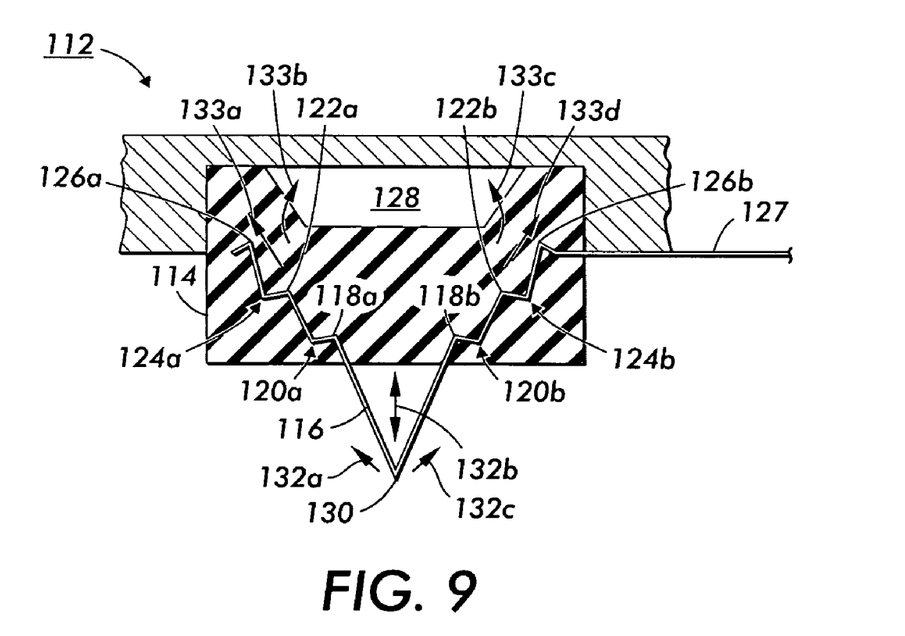

Turning to FIG. 9, set forth is printhead 112 representing a fourth embodiment. In this design, block 114 holds, and at least partially encases, charge transfer finger elements 116, whereby the majority of flexibility is positioned within block 114. Particularly, the flex points are designed in a step fashion 118a, 118b, 120a, 120b, 122a, 122b, 124a, 124b, and 126a, 126b. This embodiment includes an external connector 127. To obtain additional flexibility, block 114 is formed with an air space 128. As pressure is applied to finger contact end 130, and pressure is applied in an upward direction, as shown by arrows 132a-132c and 133a-133d, pressure extends through the aforementioned various step formed flex points as in previous designs. In addition, the inclusion of air space 128 lowers the mass of block 114, allowing even greater flexibility within block 114.

Each of the foregoing designs permits varying degrees of flexibility and rigidity. The designs may be implemented in different electric paper embodiments, dependant upon the amount of flexibility which may be required by the specific system. It is also to be understood the designs of FIGS. 6-9 are only exemplary of certain concepts and it is understood that once these general concepts are understood, designs different from those specifically shown in FIGS. 6-9 may be created.

Turning to FIGS. 10-13, illustrated are processing steps for forming a printhead arrangement such as shown in connection with FIG. 6. It is to be understood that the same processes may be used in the formation of the printheads designed in FIGS. 7-9, as well as other forms of the finger charge transfer elements.

Figure 10:
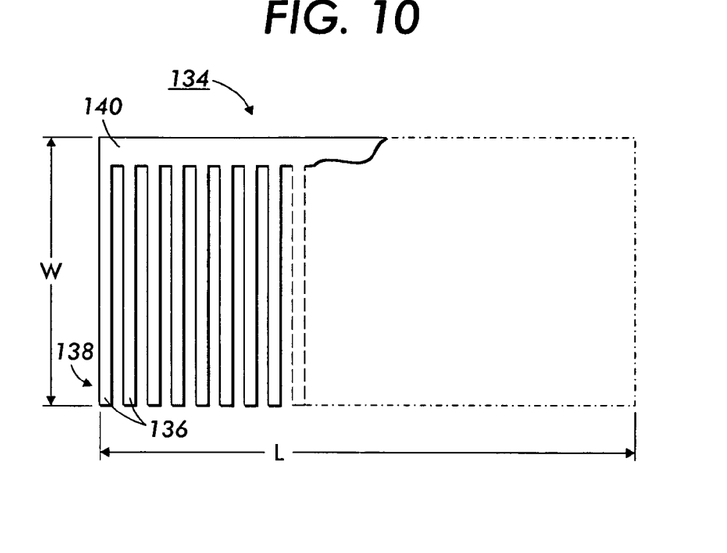
FIGS. 10-13 illustrate a process flow for constructing a printhead as in FIG. 6.
Figure 11:
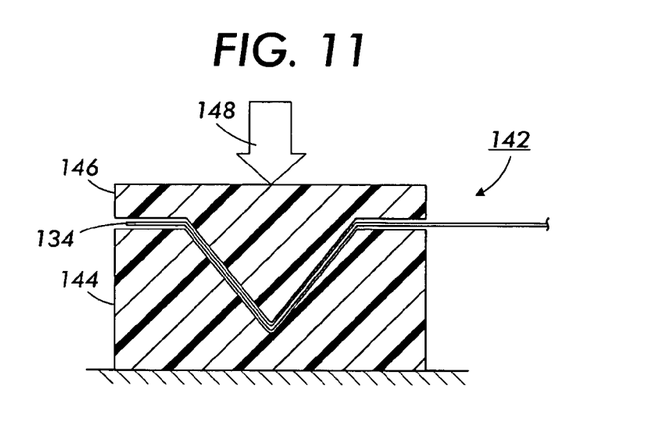
Figure 12:
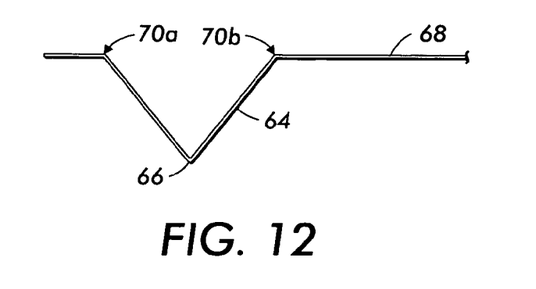

In a first step of the process, as shown in FIG. 10, a flat metal or metalized or otherwise at least partially conductive material 134 is stamped or otherwise formed to have a plurality of independently movable flat fingers 136. The multiple flat fingers are free to move at a first end 138 and are held together at a second end by an alignment tab 140. The flat material 134 may be of any length and width appropriate for a specific implementation. The formed finger structures may, in one embodiment, then be placed within a die 142 having a first section 144 and a second section 146. A force as designated by arrow 148 is applied to move the second section 146 and the first section 144 together causing deformation of the flat material 134. The design of die 142 determines the structure of a resultant finger charge transfer elements such as element 36 of FIG. 6. The formed finger elements 64, such as shown in FIG. 12, include contact point 66, as well as flex points 70a, 70b, and electrical connector 68.

In a next step in the process, finger charge transfer elements 64 are at least partially embedded in to a flexible block. In one embodiment, the flexible block may be constructed of a rubber, plastic, or other material having the appropriate modules of flexibility for a specific implementation.

Figure 13:
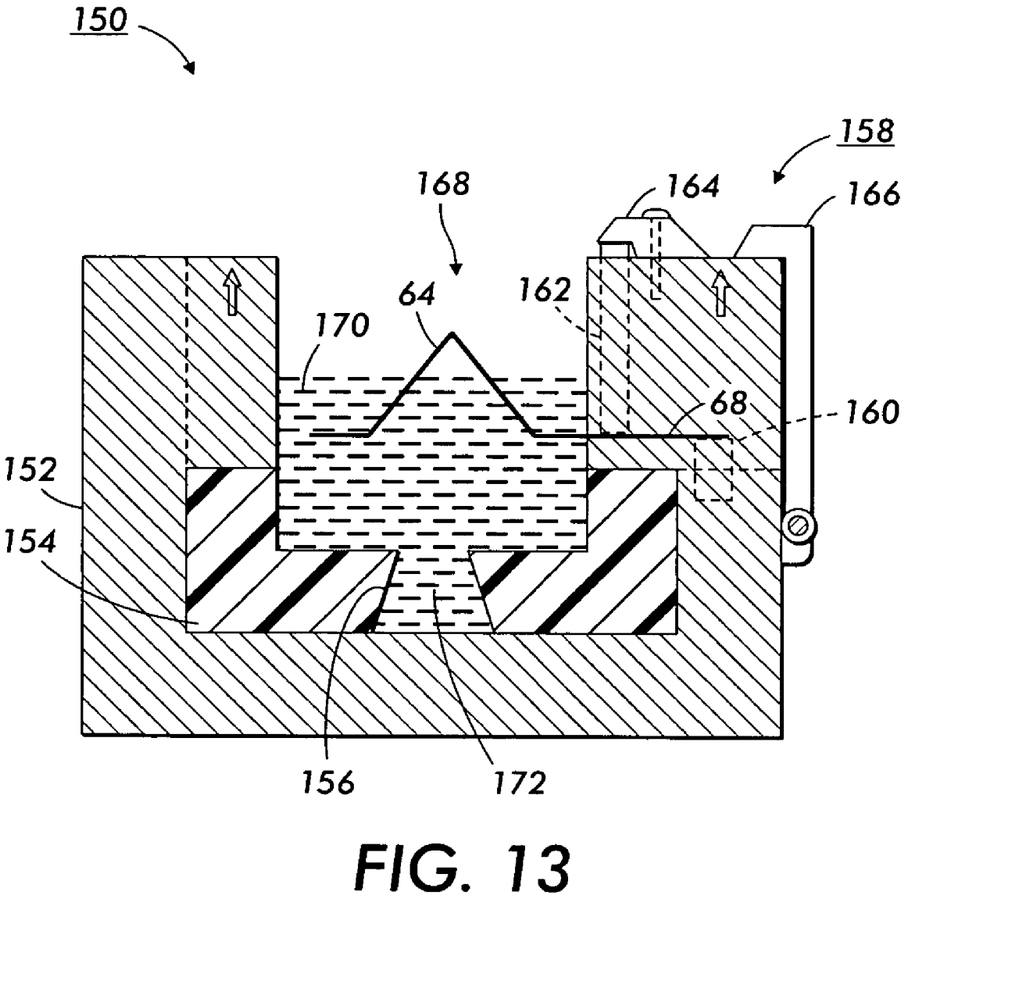

Turning attention to FIG. 13, one manner in which this embedding process may take place is through the use of a molding operation. A mold 150 includes an outer holding structure 152 in which is placed a fixed rigid support 154. Support 154 may be made of any material including a ceramic, metal, hard plastic, or other rigid structure. As can be seen in the cross-sectional view of FIG. 13, rigid structure 154 includes an opening 156 which, in this embodiment, is formed as a tapered capture hole used to form a connection with the flexible block. In a next step, finger charge transfer elements 64 are positioned at an appropriate location within mold 150. Particularly, mold 150 includes a clamping portion 158 including a bottom holding spacer 160 and a top holding spacer 162. Inserted between lower spacer 160 and upper spacer 162 is electrical contact 68 of finger elements 64. Clamping portion 158 is positioned via clamping arrangements 164 and 166 to hold electrical contact 68 in a fixed position. By this arrangement, the electrical contact 68 is held outside of cavity 168 and at least a portion of finger elements 64 are held within cavity 168 of mold 150. Following the positioning and clamping of finger elements 64, a fluidized rubber, plastic, or other flexible material 170 is poured into cavity 168 to form a flexible block such as block 62 of FIG. 6. It is to be noted, the mold is designed whereby material 170 flows into a plug 172, defined by tapered capture hole 156, which places the block into contact with rigid member 154. Thus, tapered capture hole 156 of rigid member 154 permits for contact and connection between the rigid support and the flexible block holding at least a portion of the finger elements 64.

Figure 14:
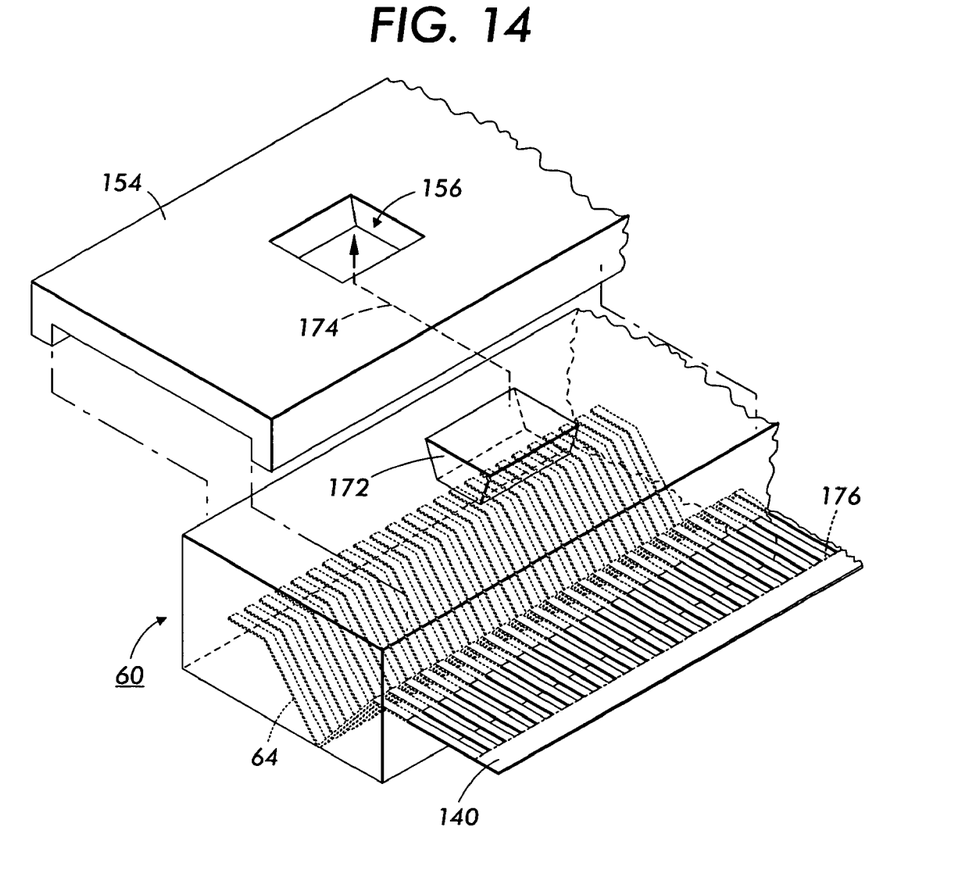
FIG. 14 is an exploded assembly view of the printhead of FIG. 6.

This interconnection is shown more particularly in the exploded assembly view of FIG. 14. As shown by arrow 174, the tapered capture hole 156 will hold the plug 172 of printhead 60 for connection to a larger printing mechanism. As also illustrated in this drawing, following the molding operation, the alignment tab 140 is cut or otherwise disengaged along line 176 from the finger elements 64. In this way, each of the now individual finger elements 64 may be associated to an external circuit.

Figure 15:
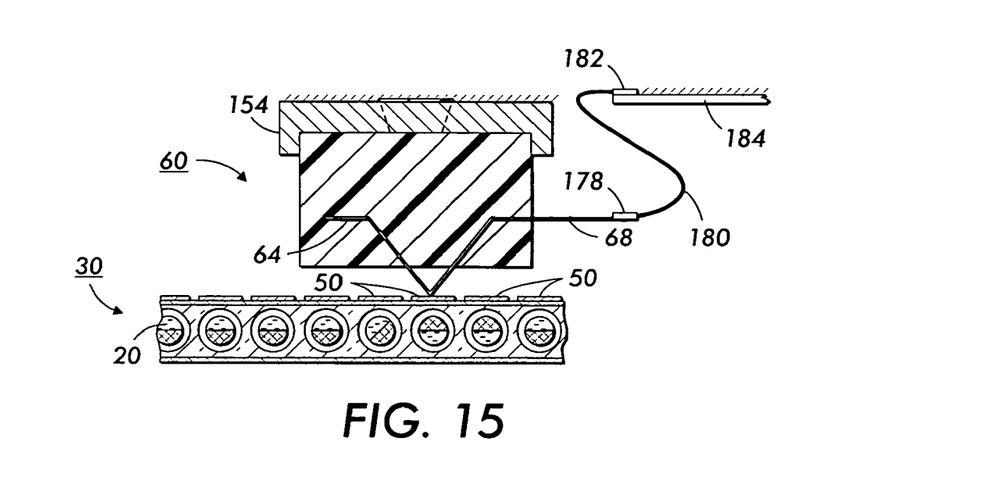
FIG. 15 shows an operational arrangement of a printhead and control system.

Turning to FIG. 15, printhead 60 of the present embodiment is shown in an operational arrangement. Particularly, printhead 60 is illustrated as being in contact with and held by rigid structure 154. The finger transfer elements 64 are in contact with islands 50 of electric sheet 30. Electrical contact 68 is soldered, or otherwise attached, at connection point 178 to a flex circuit 180. The flex circuit 180 is, in turn, connected to another connection point 182 that may be part of a circuit board 184 used to supply signals to finger elements 64. The design shown in FIG. 15 is a bi-directional printing/transfer device where the printhead 60 may be carried on a transversing carriage (not shown) connected to the rigid structure 154.

The foregoing design permits an improved contact over the plurality of finger transfer elements 64. More particularly, when one of the finger transfer elements encounter an undesirable material of debris, or an uneven area of the surfaced, the movement upward off of the surface is more particularly isolated to that specific finger due not only to the individual configuration of each transfer finger, but also to the flex points of the fingers and the use of a flexible block to hold the fingers. Whereas, in previous embodiments, each of the transfer elements were connected to each other, resulting in a larger area of lift from the electric paper. It is to be appreciated the printhead embodiments illustrated in FIGS. 7-9 may also be formed in accordance with the general process steps described above.

Figure 16:
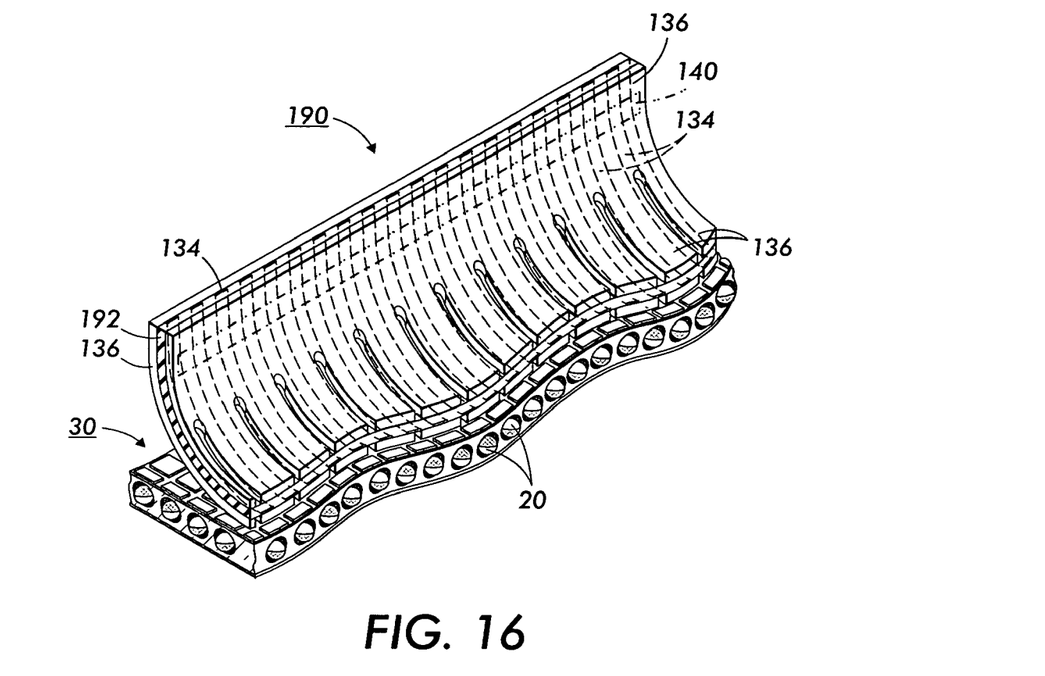
FIG. 16 is an alternative printhead.

Turning to a still further embodiment of the present application, attention is directed to the flat metalized material 134 of FIG. 10, which has been formed to have a number of independently movable flat fingers 136. Rather than deforming the flat fingers into the various structures previously described, these finger elements may be used in printhead 190 by attachment to flexible non-conductive material or substrate 192 as shown in FIG. 16. Particularly, the flat fingers 136 may be attached to a first surface of substrate 192 by any one of a number of known attachment processes such as through an adhesive, soldering or other known attachment process or through deposition techniques. It is to be noted alignment tab 140 is removed in the process. Once removed, freed ends are available for connection to an electrical circuit. In FIG. 16, fingers 136 are shown on a single surface of finger substrate 192. However, it is to be appreciated, and as shown more clearly in FIG. 17, flat fingers 136, with alignment tap 140 removed, may be located on both sides of substrate 192. By this design, bi-directional operation of a resulting printhead may be obtained as opposed to a uni-directional system when only a single side is used.

Figure 17:
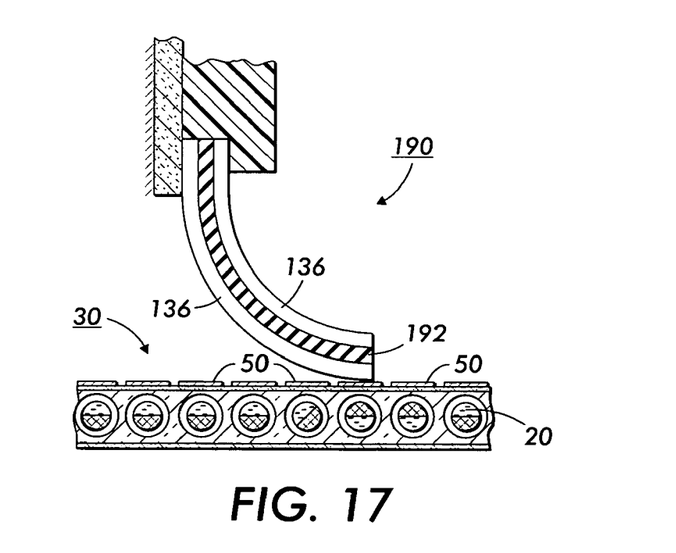
FIG. 17 is a side view of FIG. 16.
Figure 18:
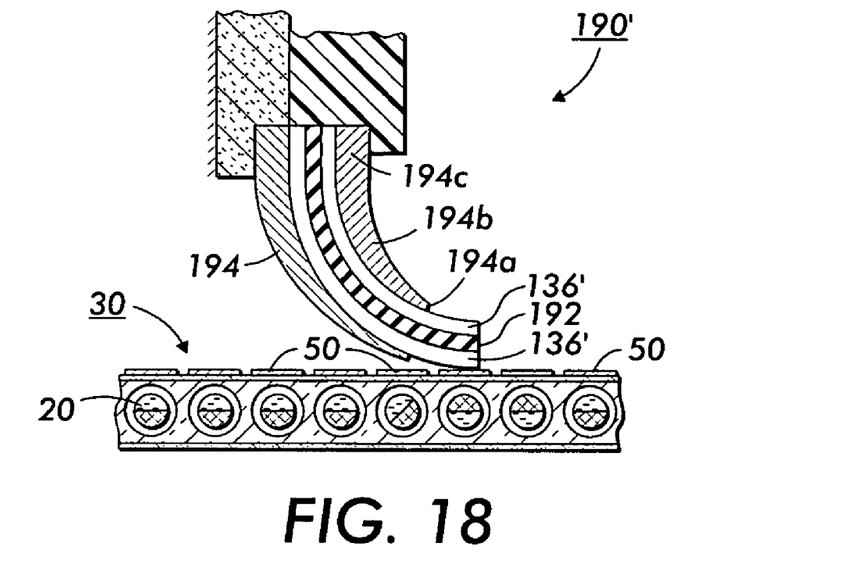
FIG. 18 shows an embodiment of a printhead with additional support elements; and, FIG. 19 depicts an embodiment of a printhead with alternative additional support elements.

The rigidity of the device of FIG. 17 may be controlled by the addition of further substrate supports. For example, in FIG. 18, printhead 190' uses flexible tapered arch supports 194 may be located on an outer surface of finger substrate 192 (carrying flat fingers 136'). The arch supports 194 may be at least one of metal, polymer, or a composite thereof. Although not shown, the disclosed embodiments may include an insulating material between the arch support 194 and the finger elements 136. As illustrated in FIG. 18, a first or proximal end 194*a* of spring support 194 is located nearest to the electric paper sheet 30 and a second or distal end 194*b* is furthest from the electric paper sheet 30. Spring supports 194 are formed in a flexible wedge design, wherein the thickness of the material increases near the distal end 194*b*. This design provides support during bi-directional operation of the system.

Figure 19:
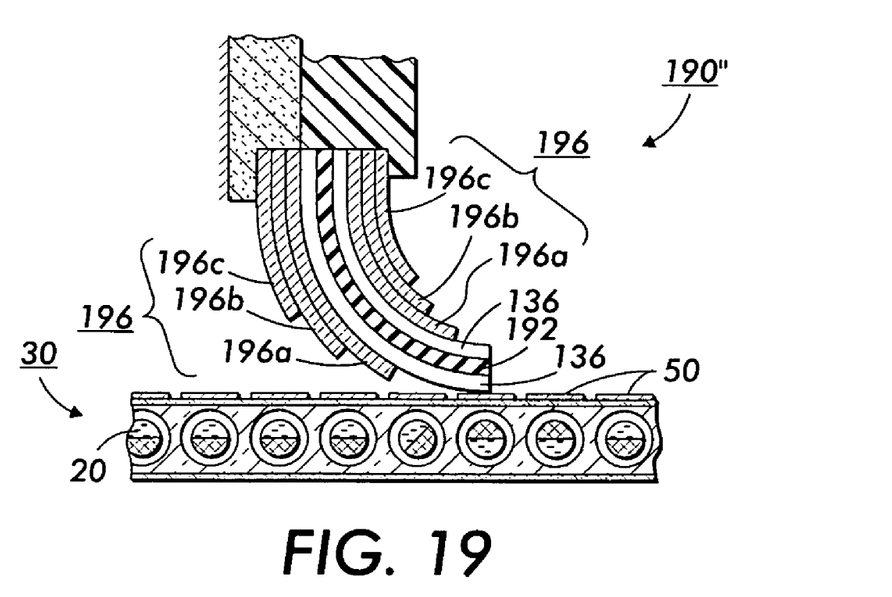

Turning to printhead 190" of FIG. 19, the arch spring supports 192 of FIG. 18 are replaced with a multi-leafed spring support systems 196 comprised of individual flexible arch support strips 196*a*, 196*b*, and 196*c*. The flexible arch support strips 196*a*-196*c* are shown in this embodiment as having a substantially uniform thickness throughout their length. The strips are arranged from the longest strip 196*a*, to be closest to finger substrate 182. Similar to the previous designs, a matching flexible leaf spring arch support 196 may be positioned on both sides of finger substrate 182 to permit bi-directional operation.

Each of the foregoing support members 190 and 196 may be designed to have individual fingers themselves such as the finger substrate 184. These fingers would be aligned with the fingers of the substrate.

The present designs will support uni-directional and bi-directional operation, which may operate over distances of many feet. This is desirable since it is know that over such distances, the media consistency will assuredly be irregular and will require some compensation for head contact mechanisms. This design may be useful in the printheads described, and others such wand printer configurations. It is to be noted that the shapes of the V-shaped metallic heads are only provided as examples, and multiple other head designs may be also considered which will provide the necessary compliance for desired head pressure.

It is to be appreciated that, while the foregoing description sets forth embodiments for charge transfer devices, the concepts of the present application may be equally extended to other embodiments upon an understanding of the present application. Particularly, it is understood others will recognize modifications and adaptations of the illustrated embodiments which are in accord with the principles of the present application. Therefore, the scope of the present application is to be defined by the appended claims.

What is claimed:

1. An electric display system comprising:
   an electric display material having two opposing outer surfaces wherein at least one of the outer surfaces is at least partially covered by a plurality of spaced apart charge-retaining islands comprised of a conductive material with areas of insulating material interposed therebetween; and
   a charge transfer device arranged in operative association with the display material, and having a first component made of a flexible non-conductive material and a plurality of individually adjustable conductive elements, wherein movement of one adjustable conductive element does not result in movement of another adjustable conductive element.

2. The electric display according to claim 1, wherein
   the first component is a flexible block of material, and
   the individually adjustable elements are charge transfer fingers, having at least a portion located within the flexible block of material.

3. The electric display according to claim 2, wherein the charge transfer fingers include an end portion extending from the flexible block at a direction towards the charge-retaining islands.

4. The electric display according to claim 3, wherein the charge transfer fingers include at least one flex point external to the flexible block, wherein the at least one external flex point increases flexibility of the charge transfer fingers.

5. The electric display according to claim 3, wherein the charge transfer fingers include at least one flex point internal to the flexible block, wherein the at least one internal flex point increases flexibility of the charge transfer fingers.

6. The electric display according to claim 3, wherein the charge transfer fingers include at least one flex point external to the flexible block, and at least one flex point internal to the flexible block, wherein the at least one external flex point and the at least one internal flex point increase the flexibility of the charge transfer fingers.

7. The electric display according to claim 3, wherein the charge transfer fingers are formed from an initially flat stamped metal having a plurality of flat finger projections which are deformed into the charge transfer fingers.

8. The electric display according to claim 3, wherein the charge transfer fingers are positioned via an alignment tab, wherein the alignment tab is removed after the charge transfer fingers are secured in the flexible block.

9. The electric display according to claim 3, wherein the charge transfer fingers include electrical contacts, the electrical contacts extending out of the flexible block to a location for connection to an electric control system.

10. The electric display according to claim 2, wherein the flexible block is comprised from at least one of a rubber or plastic.

11. The electric display according to claim 10, wherein flexible block is a mold formed flexible block.

12. The electric display according to claim 2, wherein the flexible block includes an air gap to increase the flexibility of the block.

13. The electric display according to claim 2, further including a rigid member used to hold the flexible block.

14. The electric display according to claim 13, wherein the rigid member includes tapered capture holes to hold the flexible block.

15. The electric display according to claim 1, wherein the flexible non-conductive material includes a plurality of slits along a length of the material, defining individual flaps which are at one end free to move independently of each other, and at a second end are interconnected.

16. The electric display according to 15, wherein the adjustable conductive elements are flat pieces of metal extending in a length direction to form a plurality of adjustable flat fingers which are free to move at a first end.

17. The electric display according to claim 16, wherein the plurality of adjustable flat fingers are aligned with and attached to a first surface of the flaps of the flexible non-conductive material, wherein one flap carries at least one of the flat fingers.

18. The electric display according to claim 17, wherein a second plurality of adjustable flat fingers are aligned with and attached to a second surface of the flaps of the flexible non-conductive material, wherein one flap carries at least two of the flat fingers.

19. The electric display according to claim 18, further including a first and second flexible tapered spring arch support in operational arrangement with the first and second surfaces of the flexible non-conductive material.

20. The electric display according to claim 19, wherein the first and second flexible tapered spring arch supports include a plurality of spaced slits extending from and perpendicular to an end intended to be nearest the charge-retaining islands.

21. The display system according to claim 18, further including first and second flexible leaf spring arch supports, in operative arrangement with the first and second surfaces of the flexible non-conductive material.

22. The display system according to claim 21, wherein each of the arch strips include a plurality of spaced slits extending from and perpendicular to an end intended to be nearest the charge-retaining islands.

23. The electric display according to claim 17, further including a flexible tapered spring arch support in operational arrangement with a first surface of the flexible non-conductive material, wherein the flexible tapered spring arch support is thickest at a first end which is intended to be distant from the charge-retaining islands.

24. The display system according to claim 17, further including a flexible leaf spring arch support including a plurality of progressively shorter arch strips positioned on top of each other, with the longest of the arch strips nearest a first surface of the flexible non-conductive material and the shortest of the arch strips farthest from the flexible non-conductive material.

25. The display system according to claim 1, wherein the charge transfer device is configured to operate bi-directionally.

26. A display charge transfer device configured to transfer an electric charge to charge-retaining islands of an electric display, the charge-retaining islands positioned on a surface of the electric display and spaced apart with areas of insulating material interposed therebetween, the charge transfer device comprising:
   a flexible block; and
   a plurality of charge transfer fingers at least partially held within the flexible block, finger ends and electrical connectors of the charge transfer fingers extending out of the flexible block.

27. The display charge device according to claim 26, wherein the charge transfer device is configured to perform bi-directional operations.

28. A display charge transfer device configured to transfer an electric charge to charge-retaining islands of an electric display, the charge-retaining islands positioned on a surface of the electric display and spaced apart with areas of insulating material interposed therebetween, the charge transfer device comprising:
   a first component made of a pliable non-conductive material having a plurality of slits forming a plurality of independent tabs; and
   a plurality of flat charge transfer fingers attached to at least a first surface of the tabs.

29. The display charge device according to claim 28, wherein the charge transfer device is configured to perform bi-directional operations.

* * * * *